US010379896B2

(12) United States Patent
Sergeev

(10) Patent No.: US 10,379,896 B2
(45) Date of Patent: Aug. 13, 2019

(54) METHOD OF RESILIENT OPERATION OF A VIRTUAL NETWORK FUNCTION AND SYSTEM THEREOF

(71) Applicant: ADVA Optical Networking Israel Ltd., Ra'anana (IL)

(72) Inventor: Andrew Sergeev, Kfar Saba (IL)

(73) Assignee: ADVA Optical Networking Israel Ltd., Ra'anana (IL)

( * ) Notice: Subject to any disclaimer, the term of this patent is extended or adjusted under 35 U.S.C. 154(b) by 175 days.

(21) Appl. No.: 15/726,469

(22) Filed: Oct. 6, 2017

(65) Prior Publication Data

US 2018/0101397 A1    Apr. 12, 2018

(30) Foreign Application Priority Data

Oct. 10, 2016 (IL) .......................................... 248285

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5077* (2013.01); *G06F 11/2023* (2013.01);
(Continued)

(58) Field of Classification Search
CPC .. G06F 9/45558; G06F 9/5077; G06F 11/301; G06F 11/2023; G06F 2009/45595; G06F 2009/45591; H04L 67/10
See application file for complete search history.

(56) References Cited

U.S. PATENT DOCUMENTS 8,806,266 B1 *  8/2014  Qu .................... G06F 11/1484
                                                         714/13
9,021,459 B1    4/2015  Qu
(Continued)

FOREIGN PATENT DOCUMENTS

| IN | 1116/DEL/2014 | 10/2015 |
| WO | WO 200195564 | 12/2001 |
| WO | WO 2014185833 | 11/2014 |

OTHER PUBLICATIONS

What Is Docker, https://www.docker.com/whatisdocker, accessed Jul. 9, 2018.

*Primary Examiner* — Sisley N Kim
(74) *Attorney, Agent, or Firm* — Wiggin and Dana LLP; Gregory S. Rosenblatt

(57) ABSTRACT

There is provided a method of resilient operation of a virtual network function (VNF) and a host platform configured to host VNF. The host platform comprises: first PMB configured to host first virtual platform (VP) with the help of first hypervisor, the first VP is configured, when the first hypervisor is in operational mode, to execute the VNF under primary VNF configuration; second PMB configured to host second VP with the help of second hypervisor with substantially less processing power than processing power of the first hypervisor, the second VP is configured, when the first hypervisor has failed, to execute the VNF under emergency VNF configuration. Second PMB is further configured to execute system controller operatively connected to first hypervisor, second hypervisor and I/O switch, the system controller configured to monitor status of first hypervisor and, responsive to a failure of first hypervisor, enable executing the VNF on second VP.

20 Claims, 4 Drawing Sheets

(51) Int. Cl.
*H04L 29/08* (2006.01)
*G06F 11/20* (2006.01)
*G06F 11/30* (2006.01)

(52) U.S. Cl.
CPC .. *G06F 11/301* (2013.01); *G06F 2009/45591* (2013.01); *G06F 2009/45595* (2013.01); *H04L 67/10* (2013.01)

(56) References Cited

U.S. PATENT DOCUMENTS

| | | |
|---|---|---|
| 9,430,262 B1 | 8/2016 | Felstaine et al. |
| 2012/0117241 A1 | 5/2012 | Witt et al. |
| 2012/0230223 A1 | 9/2012 | Taguchi |
| 2013/0086269 A1 | 4/2013 | Bairavasundaram et al. |
| 2013/0322441 A1 | 12/2013 | Anumala |
| 2014/0059379 A1 | 2/2014 | Ren et al. |
| 2014/0351396 A1 | 11/2014 | Stabile et al. |
| 2015/0067143 A1 | 3/2015 | Babakhan et al. |
| 2015/0089331 A1 | 3/2015 | Skerry et al. |
| 2015/0263983 A1 | 9/2015 | Brennan et al. |
| 2015/0309828 A1 | 10/2015 | Shaik et al. |
| 2016/0103698 A1 | 4/2016 | Yang et al. |
| 2016/0205518 A1 | 7/2016 | Patel et al. |
| 2016/0224409 A1* | 8/2016 | Liu ..................... H04L 67/10 |
| 2018/0307539 A1* | 10/2018 | Celozzi ................ G06F 9/5077 |

* cited by examiner

METHOD OF RESILIENT OPERATION OF A VIRTUAL NETWORK FUNCTION AND SYSTEM THEREOF

CROSS-REFERENCES TO RELATED APPLICATIONS

The present application claims benefit from Israel Application No. 248285 filed on Oct. 10, 2016 and incorporated hereby by reference in its entirety.

TECHNICAL FIELD

The presently disclosed subject matter relates to virtualization of telecommunication services and, more particularly, to managing network function virtualization (NFV) in communication networks.

BACKGROUND

Traditionally, network functions (e.g. firewalls, Load Balancers, Deep Packet Inspectors, Network Address Translators, diagnostic tools, IP-PBXs, traffic accelerators, etc.) have been provided as Physical Network Functions (PNFs) on dedicated hardware appliances that typically require physical installation at each site where such PNFs are needed.

Network Functions Virtualization is an emerging approach to transform network functions (NFs) previously performed via proprietary hardware appliances into Virtual Network Functions (VNFs). A network function (NF) is a functional building block within a network infrastructure, which has well-defined external interfaces and a well-defined functional behavior. In accordance with the Network Functions Virtualization approach, NFs can be implemented as application software which can be run on a range of standardized, high-volume servers, switches, and/or storage devices that can be located, for example, in datacenters, the customer premises or other network nodes out of data centers.

Architecture of telecom services based on Network Function Virtualization (NFV) is detailed, for example, in a series of documents published by the European Telecommunications Standards Institute (ETSI).

Virtualization of NFs enables a standardized execution for VNFs and sharing of physical hardware by multiple VNFs. Implementing of Virtual Network Function decouples the software implementation of the network function from the infrastructure resources it runs on. Thereby, NF virtualization enables a much more flexible and dynamic network than a legacy communication network.

However, virtualization increases network management complexities. Among technical challenges to be addressed in management of the virtualized environment is ensuring the appropriate level of resilience of network function operation with regard to hardware and software failures. Such problems have been recognized in the conventional art and various techniques have been developed to provide solutions, for example:

US Patent Application No. 2014/0059379 discloses a system for proactive resource reservation for protecting virtual machines. The system includes a cluster of hosts, wherein the cluster of hosts includes a master host, a first slave host, and one or more other slave hosts, and wherein the first slave host executes one or more virtual machines thereon. The first slave host is configured to identify a failure that impacts an ability of the one or more virtual machines to provide service, and calculate a list of impacted virtual machines. The master host is configured to receive a request to reserve resources on another host in the cluster of hosts to enable the impacted one or more virtual machines to failover, calculate a resource capacity among the cluster of hosts, determine whether the calculated resource capacity is sufficient to reserve the resources, and send an indication as to whether the resources are reserved.

US Patent Application No. 2015/0089331 discloses methods and apparatus for detection and handling of virtual appliance failures. In one aspect, a method is implemented on a host platform on which a hypervisor (aka Virtual Machine Manager) and a plurality of virtual machines (VMs) are running, the plurality of VMs collectively hosting a plurality of Software Defined Networking (SDN) and/or Network Function Virtualization (NFV) appliances that are communicatively coupled via a virtual network. A software-based entity running on the host platform is configured to monitor the plurality of virtual network appliances to detect failures of the virtual network appliances. In response to detection of a virtual network appliance failure, messages containing configuration information are implemented to reconfigure packet flows to bypass the virtual network appliance that has failed.

US Patent Application No. 2016/0205518 discloses a system and method for elastic scaling using a container-based platform. An embodiment method includes triggering, by a service orchestrator, creation of one or more container instances for a first service cluster. The method further includes creating, by a container manager, the one or more container instances and mapping the one or more container instances of the first service cluster to one or more first virtual machines belonging to a first virtual machine server group in accordance with a platform profile of the first virtual machine server group and the first service provided by the first service cluster. The method further includes mapping, by a virtual machine manager, the one or more first virtual machines to one or more first host virtual machines of a cloud network in accordance with the platform profile of the first virtual machine server group.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

In accordance with certain aspects of the presently disclosed subject matter, there is provided a host platform configured to host a virtual network function (VNF), the host platform comprising a first processor and memory block (PMB) and a second PMB, both operatively connected to an I/O switch. The first PMB is configured to host a first virtual platform (VP) with the help of a first hypervisor configured to be executed on the first PMB, the first VP is configured to execute the VNF when the first hypervisor is in an operational mode, the VNF to be executed on the first VP under a primary VNF configuration. The second PMB is configured to host a second VP with the help of a second hypervisor configured to be executed, on the second PMB, with substantially less processing power than processing power of the first hypervisor, the second VP is configured to execute the VNF when the first hypervisor has failed, the VNF to be executed on the second VP under an emergency VNF configuration. The second PMB is further configured to execute a system controller operatively connected to the first hypervisor, to the second hypervisor and to the I/O switch, the system controller configured to monitor status of the first hypervisor and, responsive to a failure of the first hypervisor, to enable executing the VNF on the second VP.

In accordance with other aspects of the presently disclosed subject matter, there is provided a method of operating a host platform configured to host a virtual network function (VNF), the host platform comprising a first processor and memory block (PMB) and a second PMB, both operatively connected to an I/O switch. The method comprises: hosting on the first PMB a first virtual platform (VP) with the help of a first hypervisor being executed on the first PMB, wherein, when the first hypervisor is in an operational mode, the first VP is executing the VNF under a primary VNF configuration; hosting on the second PMB a second VP with the help of a second hypervisor being executed on the second PMB, wherein processing power of the second hypervisor is substantially less than processing power of the first hypervisor, and wherein, when the first hypervisor fails, the second VP executes the VNF under an emergency VNF configuration; monitoring status of the first hypervisor by a system controller being executed on the second PMB; responsive to a failure of the first hypervisor, enabling, by the system controller, executing the VNF on the second VP.

Emergency VNF configuration can be predefined. Alternatively, at any point-in-time, configuration parameters of the emergency VNF configuration can be the same as configuration parameters of the primary VNF configuration. Yet alternatively, at any given point-in-time, configuration parameters of the emergency VNF configuration can be derived, with the help of predefined rules, from configuration parameters of the primary VNF configuration at the given point-in-time.

In accordance with further aspects and, optionally, in combination with other aspects of the presently disclosed subject matter, the VNF can comprise a first Virtual Network Function Component (VNFC) comprising a first set of instructions stored in non-transitory computer-readable media comprised in the first PMB and configured to enable, when run on the first VP, the same functionality as functionality of VNF under the primary configuration, and a second VNFC comprising a second set of instructions stored in non-transitory computer-readable media comprised in the second PMB and configured to enable, when run on the second VP, the same functionality as functionality of VNF under the emergency configuration, wherein the system controller can be configured, responsive to the failure of the first hypervisor, to switch tenant data traffic related to the VNF from the first VNFC to the second VNFC.

In accordance with further aspects and, optionally, in combination with other aspects of the presently disclosed subject matter, the emergency VNF configuration can be stored in the second PMB and the second hypervisor can be configured to update the emergency VNF configuration in accordance with updates of the primary VNF configuration.

In accordance with further aspects and, optionally, in combination with other aspects of the presently disclosed subject matter, the second hypervisor can be configured, responsive to the failure of the first hypervisor, to initiate executing the second set of instructions by the second VNFC.

Among advantages of certain embodiments of presently disclosed subject matter is capability of keeping, at least, emergency performance and/or emergency functionality of a network function whilst enabling further recovery of the network function at another host or on replacing circuitry, such capability being especially important for customer premises devices.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, host platform and respective parts thereof disclosed in the present application.

It is to be understood that the term "non-transitory memory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
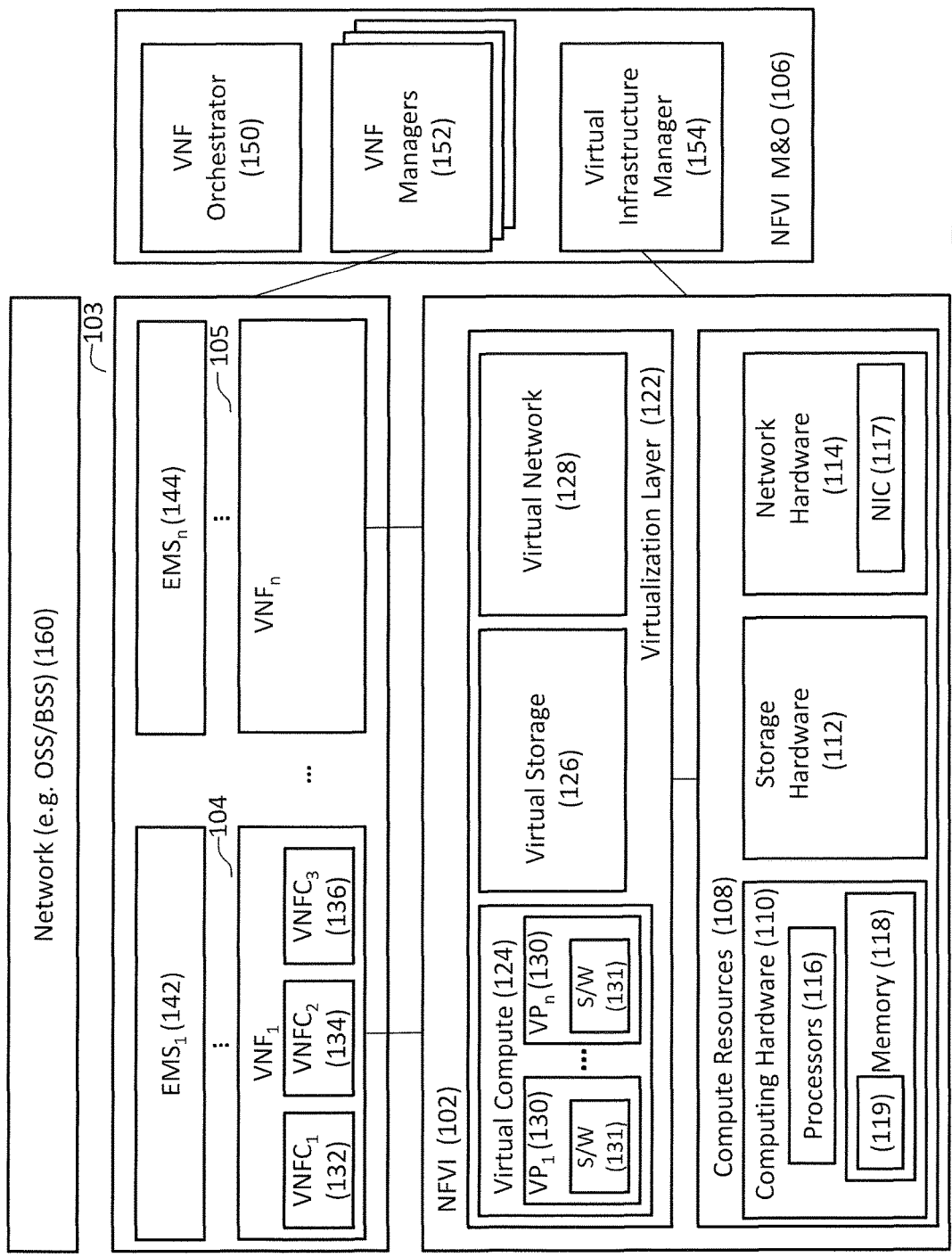
FIG. 1 illustrates a generalized schematic architecture of an exemplified NFV framework in which certain embodiments of the presently disclosed subject matter can be implemented.

Bearing this in mind, attention is drawn to FIG. 1 illustrating a generalized schematic architecture of an exemplified NFV architectural framework of a virtual environment in which certain embodiments of the presently disclosed subject matter can be implemented. The illustrated architectural framework includes a Network Functions Virtualization Infrastructure (NFVI) 102, a number of Virtualized Network Functions (VNF) 103, and NFV Management and Orchestration function (NFV M&O) 106.

NFVI 102 provides resources required to support the execution of VNFs, and includes compute resources 108. Compute resources 108 can include computing hardware 110 (including processors 116 and memory 118), storage hardware 112, and network hardware 114. The NFV-Infrastructure can span across several locations, and the network providing connectivity between these locations can be regarded as part of the NFV-Infrastructure.

NFVI 102 further includes a virtualization layer 122 configured to provide virtualization of the underlying compute resources 108. Virtualization layer 122 includes a virtual computing component 124, a virtual storage component 126, and a virtual network component 128. Virtual computing component 124 includes a number of virtualized platforms VPs 130 (indicated as $VP_1$ through $VP_n$), wherein individual VPs can be of different types (e.g. virtual machines, containers (e.g. Docker), etc.). A Virtualized Platform Manager (VPM) 119 can reside on computing hardware 110 and manage VPs 130.

A virtual machine (VM) is a software implementation of a machine (i.e. a computer) that executes programs like a physical machine. One or more Virtual Machines (VMs) can operate on a single physical computing system (also referred to as a host), while each VM operates substantially independently of its peers. For example, each VM can have its own memory space on the physical computing system, and can implement its own Operating System (OS) and associated programs. Sharing of physical resources between VMs is performed by a Virtual Machine Manager (VMM), which implements a hardware abstraction layer between the VMs and the physical resources of the system. The VMM can, inter alia, set up initial memory spaces for each VM, boot each VM onto the physical computing system, etc. The VMM can be configured to prioritize, queue, or otherwise manage the order and manner in which I/O for the VMs is processed by the resources of the physical computing system.

Containers are another example of a virtualized platform. A container includes a respective application and all of its dependencies, but shares the kernel with other containers. Containers run as an isolated process in user space on the host operating system (e.g. see https://www.docker.com/whatisdocker).

Further to virtualization of processing and memory resources, I/O operations can also be virtualized so that a single I/O hardware device (e.g. Network Interface Card 118 or port thereof) can be shared between multiple VPs.

VNFs 103 represents the software implementation of one or more network functions (illustrated as $VNF_1$ (104) to $VNF_N$ (105)) which are capable of running over NFVI 102. Each VNF can include one or more virtual network function components (VNFCs). As illustrated, $VNF_1$ 104 includes VNFCs illustrated as $VNFC_1$ 132, $VNFC_2$ 134 and $VNFC_3$ 136, each VNFC comprising application software 131 to be executed by one of VPs 130. By way of non-limiting example, $VNFC_1$, $VNFC_2$ and $VNFC_3$ can be each of a different VNFC type, with each VNFC type providing different functionality to VNF 104. Although illustrated with respect to VNF 104, all VNFs can be structured in a similar fashion and include different VMFCs running on one or more VPs.

VNFs enable the capacity of a network function to be adjusted more quickly than NFs provided by physical hardware appliances. For example, when increased capacity is required for a VNF, a network operator, via a user interface or by automated processes, communicates with and instructs the VPM to create new VPs, each VP running respective application software and forming one of the VNFCs of the VNF.

Each VNF can be operatively connected to Element Management System (illustrated as $EMS_1$ (142) and $EMS_n$ (144)) and can be configured to provide monitoring and management of a corresponding VNF.

NFV M&O 106 is configured to orchestrate and manage physical and/or software resources that support the infrastructure virtualization and management of the VNFs. NFV M&O is also configured to interact with the external systems (e.g. OSS/BSS 160), which enables NFV to be integrated into a network-wide management landscape. NFV M&O 106 comprises NFV Orchestrator 150, VNF Managers 152, and virtual infrastructure manager (VIM) 154.

By way of non-limiting example, NFV Orchestrator 150, via VIM 154, can direct VPM 119 to create a number of VPs for a number of VNFCs of VNF 104, and to load application software onto each VP such that, when executed by the VPs, forms the corresponding VNF.

VNF Manager 152 is configured to track all VPs, VNFCs and functions of a particular VNF (e.g. VNF 104), and can be provided by the vendor providing the VNF. NFV Orchestrator 150 tracks all VNFs operating on the network, the types of each VNFC and the number of VPs of each VNFC type, the performance of all VNFs, hardware resources assigned to each VNF, and hardware resources which are available for assignment.

The NFV architectural framework detailed with reference to FIG. 1 corresponds to architectural framework developed and described by the Network Functions Virtualization Industry Specification Group (NFV ISG) of the European Telecommunications Standards Institute (ETSI). Those versed in the art will readily appreciate that the teachings of the presently disclosed subject matter are not bound by the NFV architectural framework illustrated in FIG. 1; equivalent and/or modified functionality can be consolidated or divided in another manner and can be implemented in any appropriate combination of software with appropriate firmware and/or hardware.

Those skilled in the art will readily appreciate that the teachings of the presently disclosed subject matter are applicable to any suitable virtual platforms and managers thereof (referred to hereinafter as hypervisors), including virtual machines, platforms operating with container-based virtualization or any other packet-forwarding applications running on a host computer and operable in a virtualized environment.

Ensuring resilience of a virtual network function to hardware and/or software failures requires avoidance of a single point of failure. For example, the failure of a hypervisor or its underlying physical node can cascade to all hosted virtual platforms, further causing their hosted VNFs to fail. Therefore, in data centers, hypervisors are typically clustered across multiple physical servers, so that if one fails, active VPs are transferred to another. The clustered hypervisors are provided with shared storage; likewise, VP disks are located on the shared storage. Thus, administrators can evacuate VPs from a failed node, while keeping the VP characteristics such as identity, volumes, networks and state, to ensure VP availability over time.

However, due to cost and/or design constraints, shared storage and clustering based thereon may be un-implementable at customer premises and other network locations out of data centers' facilities. Furthermore, due to manageability considerations for customer premises, it can be preferable to enable resilience of a given VNF with no need of configuring a redundant VNF. In accordance with certain embodiments of the presently disclosed subject matter, resilience of a given VNF running on a customer premises equipment can be enabled by a host platform and operating thereof detailed with reference to FIGS. 2-4.

Figure 2:
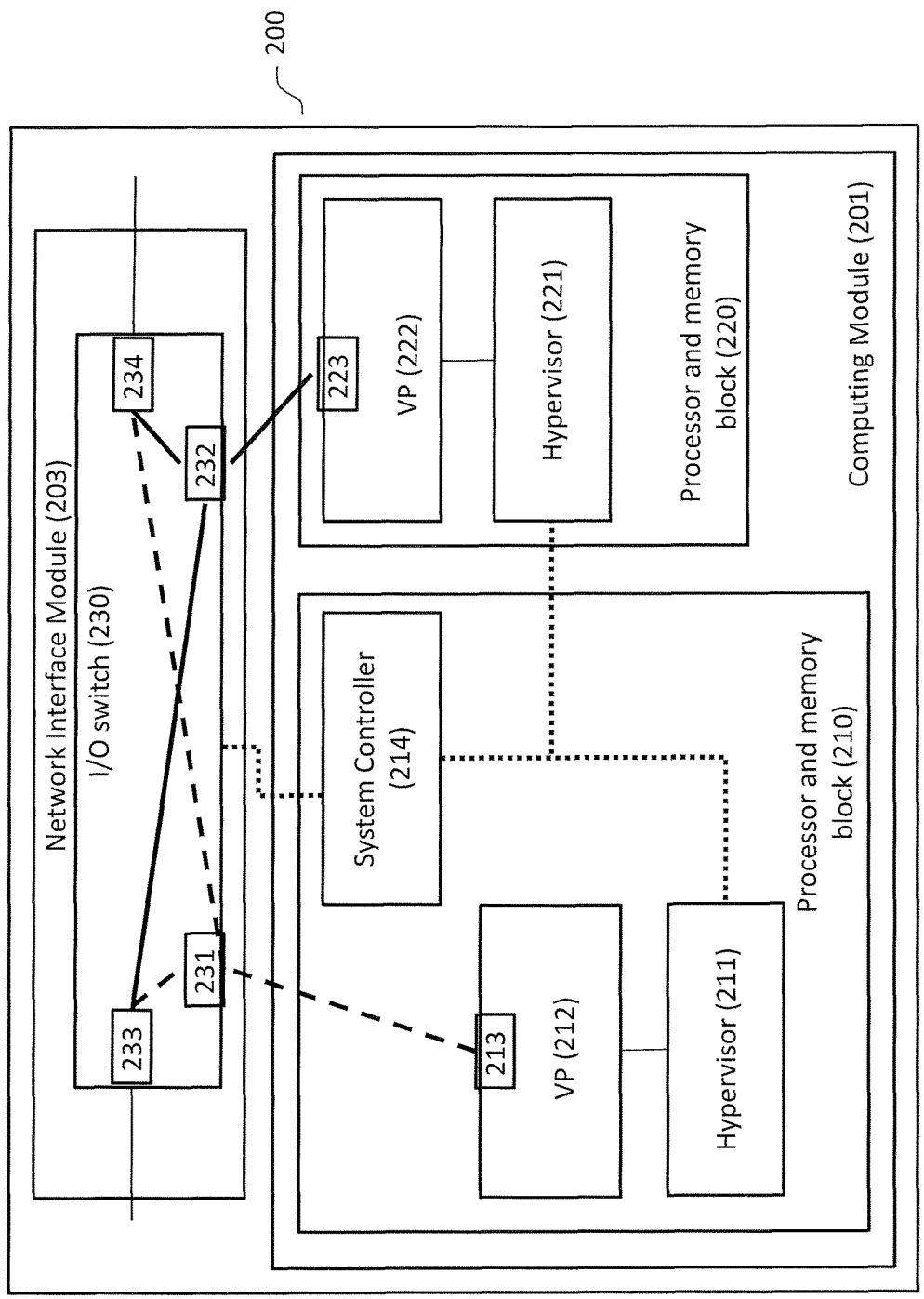
FIG. 2 illustrates a functional block diagram of a host platform configured in accordance with certain embodiments of the presently disclosed subject matter.

Referring to FIG. 2, there is illustrated a functional block diagram of a host platform (e.g. being a part of NFVI 102) in accordance with certain embodiments of the presently disclosed subject matter.

The host platform 200 comprises a computing module 201 operatively connected to a network interface module (NIM) 203. The computing module includes a processor and memory block (PMB) 220 and a processor and memory block (PMB) 210. NIM 203 comprises I/O switch 230 operatively connected to PMB 210 via internal port 231 and to PMB 220 via internal port 232. I/O switch 230 further comprises external ports 233 and 234 for interfacing with traffic to and from the host platform 200 and programmable switching logic circuitry (not shown) enabling communication between the external and internal ports.

Hypervisor 221 runs on PMB 220 and enables the PMB 220 to host at least one virtual platform (VP) 222 and to provide VP 222 with virtual processing resources and virtual memory. Hypervisor 221 further can enable PMB 220 to virtualize its physical interface (not shown) and to provide VP 222 with at least one virtual interface 223 enabling connection to port 232 of the I/O switch 230.

In accordance with certain embodiments of the presently disclosed subject matter, system controller 214 runs on PMB other than PMB executing hypervisor 221. In the illustrated embodiment, system controller 214 runs on PMB 210 located on a circuitry other than circuitry comprising PMB 220 (e.g. PMB 210 and PMB 220 can be comprised in separate ASICs (application-specific integrated circuits) and/or FPGAs field-programmable gate arrays)). PMB 210 further executes hypervisor 211 enabling PMB 210 to host at least one virtual platform (VP) 212 with at least one virtual interface 213 enabling connection to port 231 of the I/O switch 230. Virtual interfaces 213 and 223 are configured to have the same MAC address.

System controller 214 is operatively connected to I/O switch 230, hypervisor 221 and hypervisor 211 (exemplified control path is illustrated by dotted lines).

A processor (not shown separately) comprised in PMB 210 can be the same as a processor (not shown separately) in PMB 220, or can differ therefrom. By way of non-limiting example, one PMB can comprise a processor with x86 architecture, while another PMB can comprise ARM processor. Optionally, the processor comprised in PMB 210 can be characterized by substantially less processing power than the processor comprised in PMB 220.

Alternatively or additionally, hypervisor 221 can have the same architecture as hypervisor 211 or can differ therefrom. By way of non-limiting example, one hypervisor can have KVM (Kernel-based Virtual Machine) architecture while another hypervisor can have Xen architecture. Likewise, one of the hypervisors can be configured to manage virtual machines, while another can be configured to manage container-based virtual platforms.

In accordance with certain embodiments of the presently disclosed subject matter, hypervisor 211 is configured to have substantially less processing power (e.g. 25%) than hypervisor 222. As will be further detailed with reference to FIG. 4, the hypervisor 211 is further configured to enable, under emergency conditions, operating one or more VNFs running on the host platform. The term "substantially less processing power" is used herein to exclude hypervisors capable to enable emergency operation of the one or more VNFs with no degradation in performance and/or other functionality. It is noted that the processing power of hypervisor 211 can be substantially less of processing power of hypervisor 222 due to differences in characteristics of PMBs they run on (e.g. frequency, core architecture, cache, memory access, etc.)

For purpose of illustration only, the following description is provided for a host platform running a single VNF (e.g. a router, mail server, firewall, etc.). Those skilled in the art will readily appreciate that the teachings of the presently disclosed subject matter are, likewise, applicable to host platforms executing several virtual network functions.

The host platform 200 is configured to execute a VNF (not shown in FIG. 2) characterized by functionality, configuration parameters and operating parameters.

In accordance with certain embodiments of the invention, configuration parameters of VNF can be defined for a regular operation (primary VNF configuration) and for emergency operation (emergency VNF configuration). In certain embodiments, emergency VNF configuration can be the same as primary VNF configuration and, at each point-in-time, emergency configuration parameters can be maintained to be the same as parameters of VNF primary configuration.

Alternatively, emergency VNF configuration can be derived from primary VNF configuration (e.g. specify ports, addresses, applications and/or functions prioritized for emergency performance, etc.) and emergency VNF configuration parameters can be maintained as corresponding to primary VNF configuration at the same point-in-time and derived therefrom in accordance with predefined rules. By way of non-limiting example, predefined rules can specify that the emergency configuration is updated only if a received update of primary configuration meets predefined criteria (e.g. update of primary configuration is related to predefined ports, addresses, applications, functions, etc.). By way of another non-limiting example, predefined rules can specify the rules of updating emergency configuration with the help of learning a dynamic behavior of VNF operating (e.g. providing emergency priority for certain ports, addresses, applications, functions in accordance with the learned behavior).

Yet alternatively, emergency VNF configuration can be predefined for a case of emergency and can be independent of updates of primary configuration during VNF regular operation.

It is noted that, optionally, in addition to configuration parameters equal or derived from configuration parameters of VNF, emergency configuration can include prioritization of VNF functions and/or subset of VNF functions to be executed when operating under emergency configuration.

Figure 3:
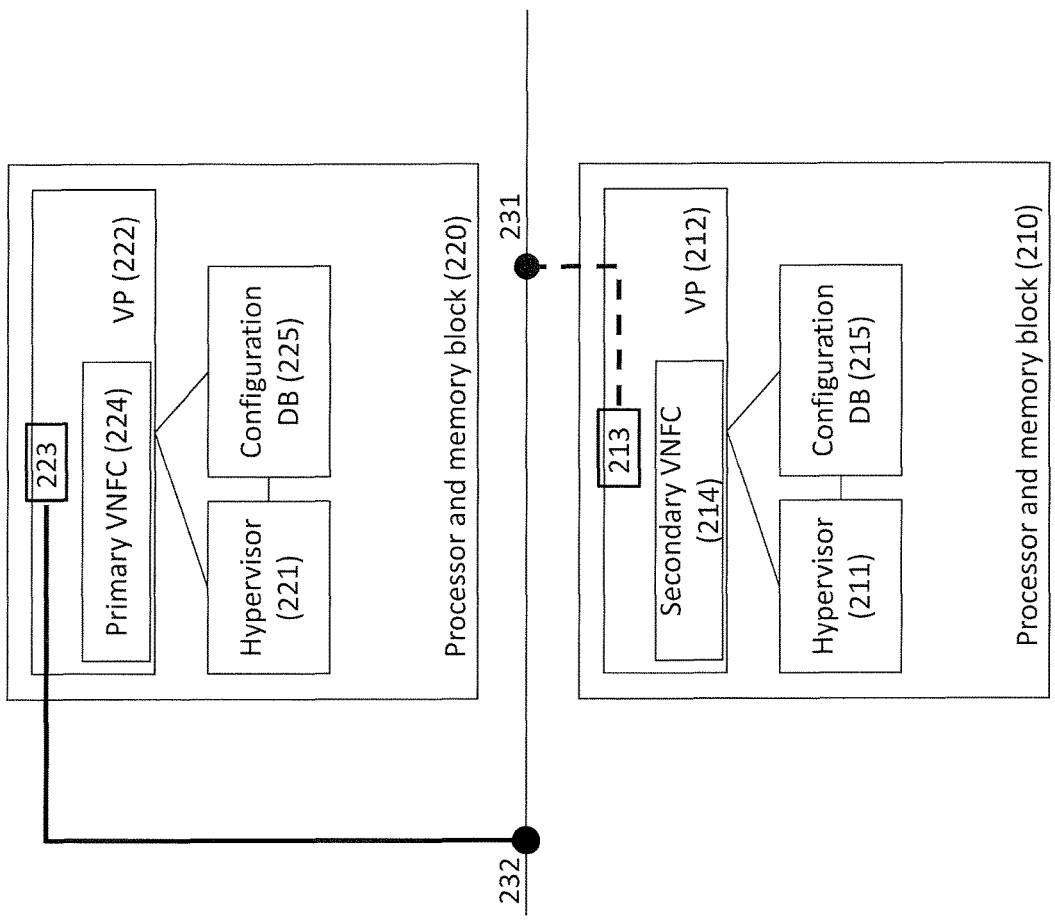
FIG. 3 illustrates a functional block diagram of configuration of a virtual network function in accordance with certain embodiments of the presently disclosed subject matter.

In accordance with certain embodiments of the presently disclosed subject matter, VNF can be configured as illustrated in FIG. 3. VNF can comprise a virtual network function component VNFC 224 and a virtual network function component VNFC 214. Initial configuration of a given VNFC on a given VP is provided by VNF Orchestrator (not shown in FIG. 2 or 3) operatively connected to the given VP(s) and configured to provide initial configuration of VNF.

VNFC 224 (referred to hereinafter as a primary VNFC) comprises a set of instructions (referred to hereinafter as a primary set of instructions) stored in non-transitory computer-readable media comprised in PMB 220 and configured to enable, when run on VP 222, the same functionality as functionality of VNF under primary configuration. VNFC 224 is configured to have, at any point-in-time, the same configuration parameters (e.g. the same rule-set for firewall functionality, the same routing table for routing functionality, etc.) as primary VNF configuration parameters; configuration of VNFC 224 is also referred to hereinafter as primary configuration of primary VNFC. Initial configuration of the primary VNFC 224 and further updates thereof are stored and maintained (e.g. following instructions of respective EMS to export configuration data) in configuration repository 225 comprised in PMB 220. The primary VNFC is further configured to execute, during a regular operation of host node 200, the primary set of instructions and, thereby, to process all tenant data traffic related to the VNF, the processing provided in accordance with primary VNF configuration.

VNFC 214 (referred to hereinafter as a secondary VNFC) comprises a set of instructions (referred to hereinafter as a secondary set of instructions) stored in non-transitory computer-readable media comprised in PMB 210 and configured to enable, when run on VP 212, the same functionality as functionality of VNF under emergency configuration. VNFC 214 is configured to have the same configuration parameters as emergency configuration parameters of VNF; configuration of VNFC 214 is also referred to hereinafter as emergency configuration of secondary VNFC.

Initial configuration of the secondary VNFC 214 and data usable for further updates thereof (e.g. updated configuration parameters of primary VNFC and, optionally, predefined rules of deriving emergency configuration parameters) are stored and maintained in configuration repository 215 comprised in PMB 210. As will be further detailed with reference to FIG. 4, the secondary VNFC 214 is further configured to execute, during an emergency operation of host node 200, the secondary set of instructions, and thereby to process all tenant data traffic related to the VNF, the second set of instructions to be executed in accordance with emergency VNF configuration. During a regular operation of host node 200, VNFC 214 is further configured not to execute the secondary set of instructions or, alternatively, to execute the secondary set of instructions in a dry-run mode (e.g. when VP 212 is blocked by switch 230 from entire respective tenant data traffic or egress data traffic of VNFC 214 is discarded by switch 230).

Figure 4:
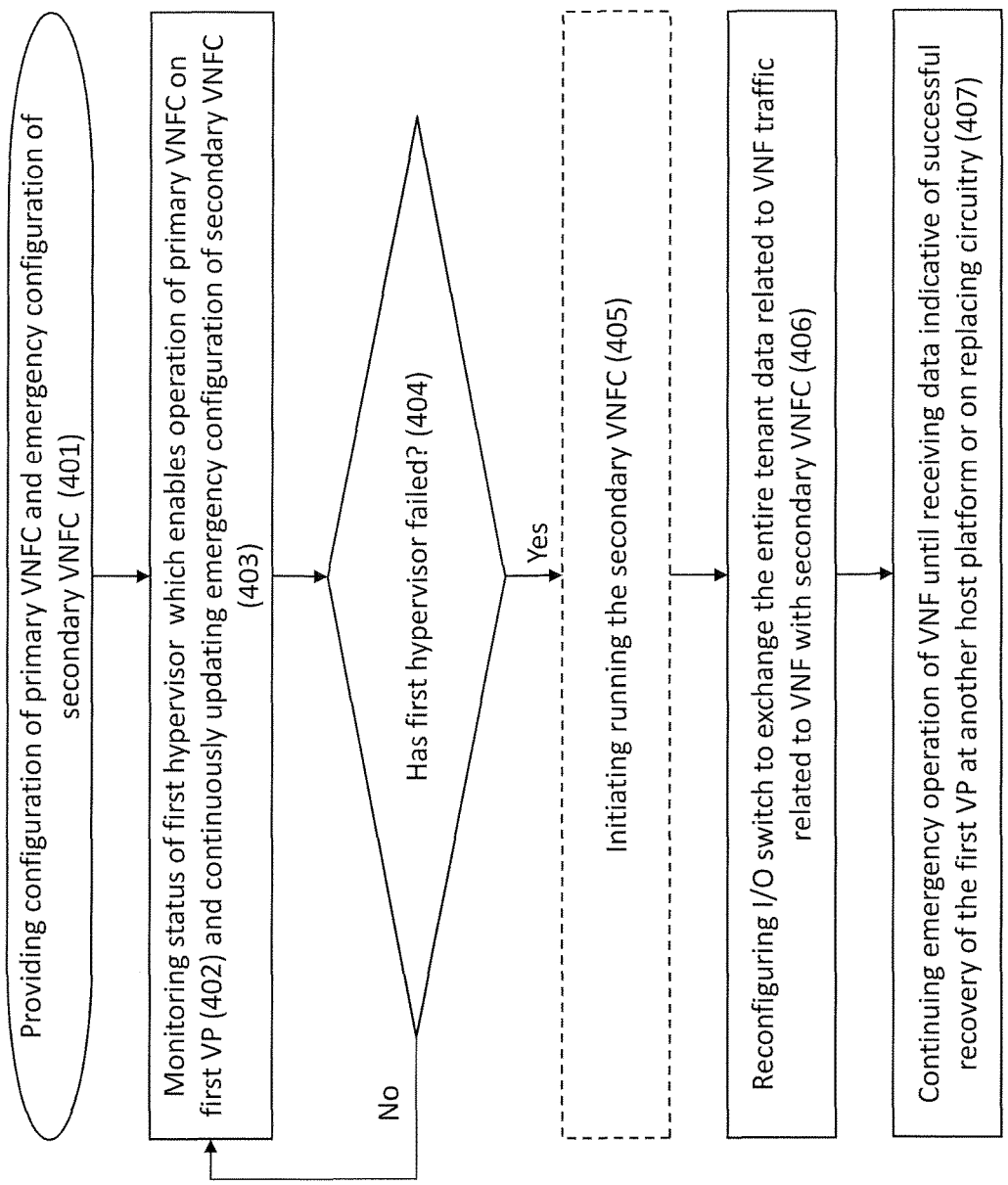
FIG. 4 illustrates a generalized flow-chart of operating the host platform in accordance with certain embodiments of the presently disclosed subject matter.

Referring back to FIG. 2, VP 222 is configured to run VNFC 224 with data path, illustrated by bold lines between port 223 and ports 233, 232 and 234. VP 212 is configured to run VNFC 224 with an emergency data path, illustrated by dashed lines between port 213 and ports 233, 232 and 234, wherein, during regular operation, related to VNF egress data traffic over the emergency data path or the entire, related to VNF, tenant data traffic over the emergency data path are configured to be blocked. Operation of VP 212 and VP 222 and VNFCs 214 and 224 is further detailed with reference to FIG. 4 illustrating a generalized flow chart of operating host platform 200 in accordance with certain embodiments of the presently disclosed subject matter.

Upon storing (401) initial primary configuration of VNFC 224 and initial emergency configuration of secondary VNFC 214 in respective configuration repositories, and upon starting the VNF operating (comprising executing the primary set of instructions and processing tenant data traffic at VP 222), system controller 214 monitors (402) status of hypervisor 221 to detect if hypervisor 221 is in an operational mode, or it has failed. By way of non-limiting example, system controller can monitor the status with the help of passing heartbeat messages, or in any other suitable manner known in the art. It is noted that a hypervisor is considered to be in an operational mode if its status matches a predefined criteria, and is considered as failed if its status does not match the predefined criteria (e.g. exceeds predefined time of operating with degraded performance, exceeds predefined number of hypervisor's resets, etc.).

In the embodiments with emergency VNF configuration being variable responsive to updates of primary VNF configuration, there is enabled continuously updating (402) emergency configuration of secondary VNFC 213. EMS instructs VNF to export configuration updates to the configuration repository 225. Hypervisor 221 continuously sends and system controller 214 continuously receives updates of configuration changes (if any) of primary VNFC 224 (the same as configuration changes of primary VNF configuration) and stores them in configuration repository 215 accessible to hypervisor 211. In embodiments with emergency VNF configuration defined to have, at any point-in-time, the same configuration parameters as primary VNF configuration, system controller 214 can further use the received updates to directly update configuration of secondary VNFC 213 when VNFC 213 is executed in dry-run mode. In embodiments with emergency VNF configuration variable as derivative of primary VNF configuration, hypervisor 211 uses predefined rules to derive updates for emergency configuration of VNFC 213 from the received updates of primary configuration parameters. Hypervisor 211 can use the derived updates to update configuration of secondary VNFC 213 when VNFC 213 is executed in dry-run mode and/or can store the derived updates in the configuration repository 215.

Optionally, updating emergency configuration can be provided with no involvement of the system controller. Hypervisor 221 can continuously receive configuration updates from configuration repository 225 and directly update hypervisor 211 which, in turn, continuously updates emergency configuration in the manner detailed above.

It is noted that unless specifically stated otherwise, it is appreciated that throughout the specification the terms "continuously receiving updates" refers to receiving (in push or pull mode) data informative of updates substantially each time a respective new data is available to system controller 214 (and/or hypervisor 221). Likewise, the term "continuously updating configuration" refers to updating configuration substantially each time when respective updates have been received.

It is noted that a failure of hypervisor 221 causes failure of VP 222 hosted at PMB 220 and VP 222 needs to be reconfigured to operate at another host. Typically, the process of VP 222 at another host can take from tens of seconds to several minutes. In accordance with certain embodiments of the presently disclosed subject matter, hypervisor 212 enables emergency operation of respective network function until successful recovery of VP 222 at the another host. Further, there might be no another host available and/or suitable to run VP 222 (especially, in a case of customer premises devices). In such a case the failed circuitry (e.g. a card comprising PMB 220) can be replaced by a new circuitry, such replacement can take from several minutes to tens of hours. In accordance with certain embodiments of the presently disclosed subject matter, hypervisor 212 enables emergency operation of respective network function until successful recovery of VP 222 on the replacing circuitry.

When system controller 214 detects (404) that hypervisor 221 fails, it reconfigures (406) I/O switch 230 to switch from traffic exchange with primary VNFC 224 (data path illustrated in FIG. 2 by bold lines) to traffic exchange with secondary VNFC 214 and to enable entire tenant data traffic to path via emergency data path (illustrated by dashed lines) between port 213 and ports 233, 231 and 234.

In cases where secondary VNFC was not dry-running before the failure of hypervisor 221, system controller 214 can inform hypervisor 211 about the failure and hypervisor 211 initiates (405), prior to switching the traffic, running the secondary VNFC (i.e. running the secondary set of instructions in accordance with emergency configuration as updated at the failure point-in-time and stored in the configuration repository 215).

Upon switching the entire related to VNF tenant data traffic to secondary VNFC 214, host platform 200 operates the VNF with emergency performance, wherein emergency operational parameters and/or emergency functionality differ from operational parameters and/or functionality during a regular operation.

Host platform 200 continues emergency operating the VNF until receiving (407) data indicative of successful recovery of VP 222 at another host platform or on replacing circuitry.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, a suitably programmed computer. Likewise, the invention contemplates a computer program product embodied in a non-transitory computer readable medium for executing the method of the invention. The invention further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A host platform configured to host a virtual network function (VNF), the host platform comprising a first processor and memory block (PMB) and a second PMB, both operatively connected to an I/O switch, wherein:
    the first PMB is configured to host a first virtual platform (VP) with the help of a first hypervisor configured to be executed on the first PMB, the first VP is configured to execute the VNF when the first hypervisor is in an operational mode, the VNF to be executed on the first VP under a primary VNF configuration;
    the second PMB is configured to host a second VP with the help of a second hypervisor configured to be executed, on the second PMB, with substantially less processing power than processing power of the first hypervisor, the second VP is configured to execute the VNF when the first hypervisor has failed, the VNF to be executed on the second VP under an emergency VNF configuration;
    the second PMB is further configured to execute a system controller operatively connected to the first hypervisor, to the second hypervisor and to the I/O switch, the system controller configured to monitor status of the first hypervisor and, responsive to a failure of the first hypervisor, to enable executing the VNF on the second VP.

2. The host platform of claim 1, wherein the emergency VNF configuration is predefined.

3. The host platform of claim 1, wherein, at any point-in-time, configuration parameters of the emergency VNF configuration are the same as configuration parameters of the primary VNF configuration.

4. The host platform of claim 1, wherein, at any given point-in-time, configuration parameters of the emergency VNF configuration are derived, with the help of predefined rules, from configuration parameters of the primary VNF configuration at the given point-in-time.

5. The host platform of claim 4, wherein the predefined rules are selected from the group consisting of predefined rules specifying that the emergency configuration is updated only responsive to an update of primary configuration which meets predefined criteria and predefined rules specifying that the emergency configuration is updated with the help of learning a dynamic behavior of VNF operating.

6. The host platform of claim 1, wherein the emergency configuration specifies a prioritization of VNF functions.

7. The host platform of claim 1, wherein the emergency configuration specifies a subset of VNF functions to be executed when operating the VNF under emergency configuration.

8. The host platform of claim 1, wherein the VNF comprises a first Virtual Network Function Component (VNFC) comprising a first set of instructions stored in non-transitory computer-readable media comprised in the first PMB and configured to enable, when run on the first VP, the same functionality as functionality of VNF under the primary configuration, and a second VNFC comprising a second set of instructions stored in non-transitory computer-readable media comprised in the second PMB and configured to enable, when run on the second VP, the same functionality as functionality of VNF under the emergency configuration, and
    wherein the system controller is configured, responsive to the failure of the first hypervisor, to switch tenant data traffic related to the VNF from the first VNFC to the second VNFC.

9. The host platform of claim 8, wherein the emergency VNF configuration is stored in the second PMB and the second hypervisor is configured to update the emergency VNF configuration in accordance with updates of the primary VNF configuration.

10. The host platform of claim 8, wherein the second hypervisor is configured, responsive to the failure of the first hypervisor, to initiate executing the second set of instructions by the second VNFC.

11. A method of operating a host platform configured to host a virtual network function (VNF), the host platform comprising a first processor and memory block (PMB) and a second PMB, both operatively connected to an I/O switch, the method comprising:

hosting on the first PMB a first virtual platform (VP) with the help of a first hypervisor being executed on the first PMB, wherein, when the first hypervisor is in an operational mode, the first VP is executing the VNF under a primary VNF configuration;

hosting on the second PMB a second VP with the help of a second hypervisor being executed on the second PMB, wherein processing power of the second hypervisor is substantially less than processing power of the first hypervisor, and wherein, when the first hypervisor fails, the second VP executes the VNF under an emergency VNF configuration;

monitoring status of the first hypervisor by a system controller being executed on the second PMB;

responsive to a failure of the first hypervisor, enabling, by the system controller, executing the VNF on the second VP.

12. The method of claim 11, wherein the emergency configuration is predefined.

13. The method of claim 11, wherein, at any point-in-time, configuration parameters of the emergency VNF configuration are the same as configuration parameters of the primary VNF configuration.

14. The method of claim 11, wherein, at any given point-in-time, configuration parameters of the emergency VNF configuration are derived, with the help of predefined rules, from configuration parameters of the primary VNF configuration at the given point-in-time.

15. The method of claim 11, wherein emergency configuration specifies a prioritization of VNF functions.

16. The method of claim 11, wherein emergency configuration specifies a subset of VNF functions to be executed when operating the VNF under emergency configuration.

17. The method of claim 11, wherein the VNF comprises a first Virtual Network Function Component (VNFC) comprising a first set of instructions stored in non-transitory computer-readable media comprised in the first PMB and configured to enable, when run on the first VP, the same functionality as functionality of VNF under the primary configuration, and a second VNFC comprising a second set of instructions stored in non-transitory computer-readable media comprised in the second PMB and configured to enable, when run on the second VP, the same functionality as functionality of VNF under the emergency configuration, the method further comprising switching by the system controller, responsive to the failure of the first hypervisor, tenant data traffic related to the VNF from the first VNFC to the second VNFC.

18. The method of claim 17, further comprising updating by the second hypervisor the emergency VNF configuration in accordance with updates of the primary VNF configuration, wherein the emergency VNF configuration is stored in the second PMB.

19. The method of claim 17, further comprising, responsive to the failure of the first hypervisor, initiating, by the second hypervisor, execution of the second set of instructions by the second VNFC.

20. A non-transitory computer readable medium comprising instructions that, when executed by a computer, cause the computer to perform a method of operating a host platform configured to host a virtual network function (VNF), the host platform comprising a first processor and memory block (PMB) and a second PMB, both operatively connected to an I/O switch, the method comprising:

hosting on the first PMB a first virtual platform (VP) with the help of a first hypervisor being executed on the first PMB, wherein, when the first hypervisor is in an operational mode, the first VP is executing the VNF under a primary VNF configuration;

hosting on the second PMB a second VP with the help of a second hypervisor being executed on the second PMB, wherein processing power of the second hypervisor is substantially less than processing power of the first hypervisor, and wherein, when the first hypervisor fails, the second VP executes the VNF under an emergency VNF configuration;

monitoring status of the first hypervisor by a system controller being executed on the second PMB;

responsive to a failure of the first hypervisor, enabling, by the system controller, executing the VNF on the second VP.

* * * * *